United States Patent [19]

Bader

[11] 4,449,546
[45] May 22, 1984

[54] CONTROLLER WITH ADJUSTABLE PROPORTIONALITY RANGE

[75] Inventor: Horst Bader, Filderstadt, Fed. Rep. of Germany

[73] Assignee: Eckardt AG, Fed. Rep. of Germany

[21] Appl. No.: 274,501

[22] Filed: Jun. 16, 1981

[30] Foreign Application Priority Data

Jun. 21, 1980 [DE] Fed. Rep. of Germany ....... 3023316

[51] Int. Cl.³ .......................... F01B 19/00; F16J 3/04; F15B 5/00
[52] U.S. Cl. ........................................... 137/86; 92/37
[58] Field of Search ...................... 137/86, 85; 91/388; 92/37, 38, 39

[56] References Cited

U.S. PATENT DOCUMENTS 2,585,347  2/1952  Robins ................................. 137/85
2,661,754 12/1953  Donaldson, Jr. ..................... 137/86
3,090,395  5/1963  Weiss et al. ............................ 137/86
3,448,753  6/1969  Marucci et al. ....................... 137/86

Primary Examiner—Paul E. Maslousky
Attorney, Agent, or Firm—Craig & Burns

[57] ABSTRACT

A controller with adjustable proportionality range wherein a ring is acted upon by a pressure differential in measuring unit formed as, for example, pairs of bellows or the like. The measuring units have axes of effectiveness which are perpendicular to each other. The ring cooperates as a baffle ring with a pivotable nozzle. The measuring units are articulated in diametrical opposition to the ring with the axes of effectiveness of one of the measuring units extending radially and the axis of effectiveness of the other measuring unit extending tangentially of the ring or in parallel to the tangential direction.

28 Claims, 8 Drawing Figures

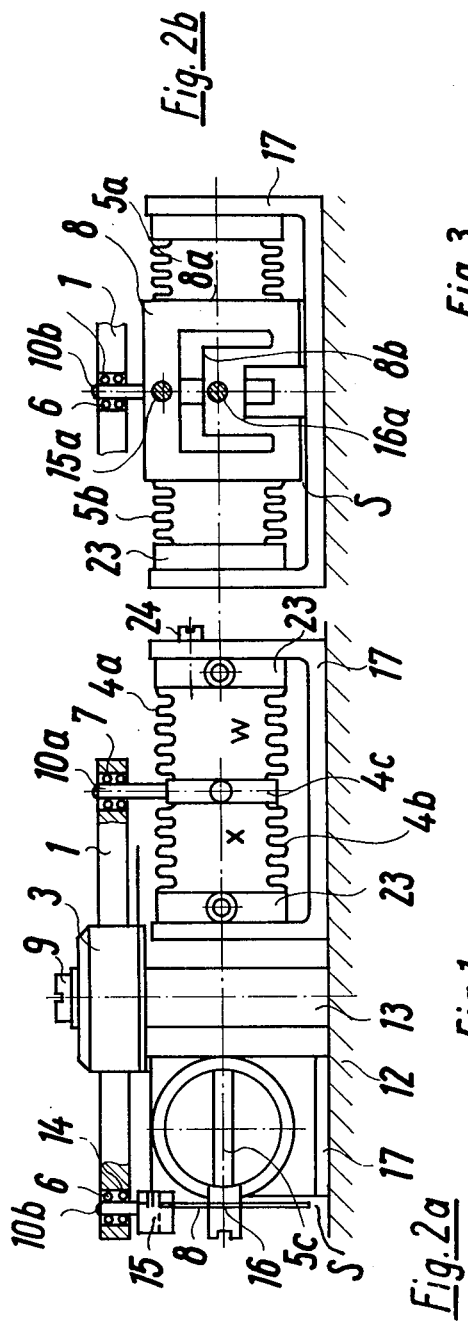

CONTROLLER WITH ADJUSTABLE PROPORTIONALITY RANGE

The present invention relates to a controller and, more particularly, to a controller with an adjustable proportionality range wherein a ring is acted upon by pressure differences in measuring units formed as, for example, pairs of bellows or the like, having axes of effectiveness which are perpendicular to each other, with the ring cooperating as a baffle ring with a pivotable nozzle.

Controllers of the aforementioned type have been proposed in, for example, German Pat. No. 1,126,657 wherein the measuring units are arranged as bellows within a baffle ring in a cross shape so that the two ends of the bellows are respectively attached to an inner circumference and a cube-shaped central member. A disadvantage of this proposed construction is that a deflection due to the exposing of one of the pair of bellows to a pressure, does not leave the other pair of bellows unaffected, because the bellows pairs are coupled with each other due to their mounting to the ring. Since the ring is merely held by the four bellows at their respectively outer ends, even a static pressure exposure of the ring by the bellows may deform the ring.

In German Offenlegungsschrift No. 1,523,489, it has been proposed to replace the baffle ring by a circular segment. However, a disadvantage of this proposed construction is that displacements caused by one pair of bellows exposed to a pressure exert, through the circular segment, a torque on the other pairs of bellows producing error sources in the overall comparator system.

The object of the present invention is to provide a control device or controller wherein different control variables do not influence one another and wherein the ring of the controller is prevented from being deformed by exposure to static pressures.

In accordance with the advantageous features of the present invention, the measuring units are articulated to the ring in diametrical opposition with an effective axis of one measuring unit extending radially and an effective axis of the other measuring unit extending tangentially or in parallel to a tangential direction.

Because the measuring units of the present invention are articulated to the ring in diametrical opposition and the effective axis of one of the measuring units extends radially; whereas the effective axis of the other measuring unit extends tangentially or in parallel to the tangential direction, displacements of the measuring units evoked by pressure differential are decoupled from each other. Consequently, there is no disturbance of the control properties by a transmission of a movement of a pressure-exposed measuring unit to a measuring unit which is not exposed to pressure. Moreover, a deformation of the baffle ring due to static pressures is avoided since the measuring units do not rest on the baffle ring, but merely transmit the displacements corresponding to the pressure differences.

Another advantage of the present invention is that the points of connection or application of the measuring units are in diametrical opposition so that the effective axis of the measuring units intersect one another at the point of connection or application. Because of this, one measuring unit will act in a tangential direction or in a direction parallel to the tangential direction. The unit which acts on the ring in the radial direction effects a parallel displacement of the ring along the effective direction; whereas, the measuring unit acting in the tangential direction effects a pivoting of the ring about the point of application of the measuring unit acting in the radial direction. By a superposition of these two direction components, the baffle ring may be shifted with respect to the nozzle into any desired direction within the desired range with a nozzle pivot arm cooperating with the baffle ring over a possible angular range of 360°. Of course, the movement executed in the effective axes may also be the resultant of several measuring units coupled with each other by way of a lever. Therefore the controller system of the present invention exhibits symmetry to a straight connecting line of points of articulation.

Advantageously, the measuring units are pairs of bellows, with the points of application or connection of the respective pairs of bellows at the circumference of the ring being constructed as ball bearings. The ball bearings are seated, without clearance, in bores in a region of the circumference of the baffle ring. Therefore an almost frictionless transmission of the displacements to the ring is ensured. The ring may be turned without friction about the point of application of the bellows pairs acting in the radial direction after being exposed to a pressure by the pair of bellows acting in the tangential direction. Thus, the displacements corresponding to the pressure differences may be transmitted without losses to the baffle ring, attaining a very exact control.

An advantageous arrangement of the pairs of bellows is to arrange the bellows in a plane below the baffle ring so that one pair of bellows lies within a circumferential radius of the baffle ring in a direction in parallel to the tangent and the other pair of bellows lies in the radial direction. Additionally one bellows of the bellows pair acting in the radial direction is located within the circumferential radius of the baffle ring and the other bellows lies outside the circumferential radius of the baffle ring. Thus, a compact construction is achieved which does not require any special transmitting means for the displacements of the bellows to the baffle ring such as, for example, a lever or spring connection. Because the bellows are arranged so that it is easy to mount vertically extending pins to central sections of the pairs of bellows, which connect the pairs of bellows to the baffle rings through the ball bearings.

Advantageously, a spring mounting may be provided for the transmission pin at the pair of bellows which has an effective axis oriented tangentially or in parallel to the tangential direction.

Advantageously, the spring mounting may take the form of a leaf spring which includes two nestled, U-shaped leaf spring brackets jointed together at their ends, with the mounting for the transmission pin attached to the outer bracket and with the inner bracket connected by suitable fasteners such as, for example, screws or the like to a central section of the pair of bellows. Because of this leaf spring, the displacement of the pair of bellows which takes place in the tangential direction is transmitted directly to the baffle ring, without frictional losses. Whereas, if a pressure is exerted on the pair of bellows acting in the radial direction, the upper bracket of the leaf spring, wherein rests the transmission pin in the ball bearing of the baffle ring, will be spread apart with respect to the inner bracket. The inner bracket is fixedly joined to the pair of bellows acting in the tangential direction so that a parallel displacement of the ring in the radial direction is possible without impairing or deflecting the effective axis of the bellows measuring unit acting in the tangential direction.

It is also advantageous to arrange one or both pairs of bellows in a plane beneath the baffle ring outside of a circumference of the baffle ring and to transmit the movements of the pairs of bellows caused by exposure to pressure to the baffle ring by means of suitable elements such as, for example, leaf springs or lever arms. Preferably, this arrangement may be chosen if no special requirements must be met with regard to the spatial dimensions of the controller and, for example, if the control is to be executed by the cooperation of two nozzles with the baffle ring. Because there are no bellows mounted in a plane beneath the ring within the circumference there is sufficient space for arranging a collecting nozzle or the like. As with the construction described hereinabove, the lever arms or the leaf springs necessary for transmitting the displacement to the baffle ring may be connected through ball bearings with the baffle ring so that an exact mode of operation of the controller is not impaired.

In order to obtain a compact controller arrangement, the nozzle is pivotably mounted to a nozzle stem so that an orifice of the nozzle points in a radial direction to the inner circumference of the baffle ring. Thus, regulation takes place over a distance between the inner circumference of the baffle ring and the orifice of the nozzle so that a height of the controller may be relatively low, and the bellows may be arranged in a plane within a circumference lying beneath the baffle ring.

It is also possible in accordance with the present invention to provide for different arrangements to obtain the necessary cooperation between the nozzle and the baffle ring. For example, a control may be effected by an edge regulation by providing the nozzle swivel arm in a plane above the baffle ring and by mounting the nozzle to an underside of the swivel arm in a vertical direction above an inner edge of the baffle ring. This is accomplished so that an orifice of the nozzle points toward an upper inner edge of the baffle ring. With such an arrangement, a movement of the pairs of bellows then displaces the baffle ring beneath the nozzle orifice with respect to the latter so that the air pressure in the orifice of the nozzle varies in dependence upon a movement of the baffle ring.

It is also possible in accordance with the present invention to fashion the baffle ring as a flat member and to mount a jet nozzle above a top inner edge of the baffle ring. It is also possible to mount a receiving nozzle or collecting hole below the bottom inner edge of the baffle ring by a bifurcate nozzle swivel arm, with an air stream flowing in a vertical direction from the jet nozzle to the receiving nozzle. Thus, the aforementioned baffle ring is movable between the orifice of the jet nozzle in a horizontal direction to vary the flow cross sections thereof. This arrangement offers the advantages of recovering a high percentage of the air stream which can thus be returned to the control circuit. Consequently, it is not necessary for the pressure supply source to make large amounts of compressed air available. A further advantage of constructing the baffle ring of a flat shape is that if vibrations occur, the baffle ring cannot knock against the jet nozzle. Thus, it is possible to provide for a shock proof regulation in an extremely simple manner.

It is also possible in accordance with the present invention, to hold or mount two jet nozzles by a bifurcate nozzle swivel arm above a top inner edge of the baffle ring, as well as below a bottom inner edge of the baffle ring. With such an arrangement, the air flows from below as well as from above onto the inner edge of the baffle ring. Also, the pressure differential or differences which occur based upon the position of the baffle ring between the two nozzles results in a signal pressure which may then be utilized for control purposes.

In order to affix the nozzle swivel arm in a predetermined position with respect to the baffle ring and to ensure a constant adjustment of the nozzle during an operation of the controller, in accordance with further advantageous features of the present invention, the nozzle swivel arm is held or mounted at the nozzle stem by a threaded connection.

Accordingly, it is an object of the present invention to provide a controller which avoids, by simple means, shortcomings and disadvantages encountered in the prior art.

A further object of the present invention is to provide a controller with an adjustable proportionality range which is simple in construction and, therefore, relatively inexpensive to manufacture.

A still further object of the present invention is to provide a controller which functions reliably under all operating conditions.

A further object of the present invention is to provide a controller wherein different control variables do not influence one another.

A still further object of the present invention is to provide a controller having a plurality of measuring units with the actions of the respective measuring units not affecting the remaining measuring units.

Yet another object of the present invention is to provide a controller which minimizes, if not avoids the generation of potential error sources.

These and other objects, features, and advantages of the present invention will become more apparent from the following description when taken in connection with the accompanying drawing which shows, for the purposes of illustration only, one embodiment in accordance with the present invention, and wherein:

FIG. 1 is a top view of a controller constructed in accordance with the present invention;

FIG. 2a is a cross sectional view taken along the line I—I in FIG. 1;

FIG. 2b is a cross sectional view taken along the line II—II in FIG. 1;

FIG. 3 is a top view of a further embodiment of a controller in accordance with the present invention;

Figure 4A:
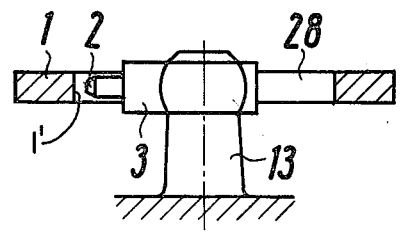
FIG. 4a is a partial cross sectional side view of a nozzle baffle tap or pick-up wherein control is performed by way of cooperation of the nozzle with an inner circumference of a baffle ring.

Referring now to the drawings and, more particularly, to FIG. 1, a first pair of bellows 5 includes bellows 5a, 5b and a second pair of bellows 4 includes bellows 4a, 4b with the respective pairs of bellows 4, 5 arranged in a plane disposed beneath a baffle ring 1. The pair of bellows 5a, 5b and the bellows 4b are disposed within a circumferential confine or space of the baffle ring 1, with the bellows 4a located outside of the circumferential space. The ball bearings 6, 7 are mounted on the baffle ring 1 in diametrical opposition along an axis I—I corresponding to a diameter of the baffle ring 1. The two ball bearings 6, 7 connect the baffle ring 1 to center sections 4c and 5c of the pair of bellows 4, 5. A nozzle swivel or pivot arm 3 is disposed within the confines of the baffle ring 1. In a plane therewith, the nozzle pivot or swivel arm 3 is held on a nozzle stem 13 by a fastener such as, for example, a screw 9. A baffle nozzle 2, pointing in a direction toward an inside of the baffle ring 1, is mounted at the head of the nozzle stem 13 at a free end of the arm 3.

The bellows pairs 4, 5 are each mounted in U-shaped holders 17 so that lines of effectiveness shown as axes I—I and II—II of the bellows pairs 4, 5 are perpendicular to each other, with the bellows 4 acting in parallel to the axis II—II. Axis II—II is perpendicular to the axis I—I and extends through an axis of rotation of the ball bearing 6. A central section 4c of the bellows pair 4 is located in a center beneath the ball bearing 7 and extends tangentially to the baffle ring 1. A central section 5c of the bellows pair 5 extends between the ball bearing 6 and a center of the baffle ring 1 so that an outermost side lies vertically beneath the ball bearing 6. A threadably attached leaf spring 8 is provided on the outermost side of the bellows pair 5 and extends along the axis II—II.

In order to realize a quadrant controller circuit or connection with a controller arrangement constructed in accordance with the present invention, the bellows pair 5 functions as a return or feedback bellows pair, with the bellows 5b carrying out a R− controller function and the bellows 5a carrying out a R+ controller function. Thus, the feedback bellows 5a, 5b serve the feedback in one direction (R− controller as a follow-up bellows) or, accordingly, in the other direction (R+ controller function, acting as a reset bellows). The bellows 4b acts as a control variable X and the bellows 4a acts a guide variable W.

In automatic control technology, control is defined as a process in which a physical magnitude i.e., a controlled variable representing a measured value or measured variable, is continuously picked up and influenced by comparison to another magnitude i.e., a control input W representing a set point or desired value in a sense of being adapted to it. The value established for the control input W determines the value that the controlled variable X is going to assume.

A P-range, i.e., a proportional band or gain adjustment is a range by which the controlled variable X has to change in order to change the actuating variable in a P-controller over the total range of controller output. More particularly, as apparent from FIG. 1, if the nozzle 2 with the nozzle pivot arm 3 is positioned so that it points along the axis I—I of the X, W bellows pair 4 to the point 6 of articulation of the bellows pair 5, then the controller exhibits its smallest P-range. That is, it is almost an on off controller, for the nozzle 2 is exposed to the full displacement effect by the bellows pair for the variables X and W, and a movement of the return or feedback bellows 5 takes place in parallel to a position of the nozzle 2 and the baffle ring 1. This is, it does not result in a displacement return that would affect the spacing between the nozzle and baffle ring. In contradistinction thereto, if the nozzle 2 is in parallel to the effective axis II—II of the bellows pair 5, i.e., displaced clockwise by an angle of approximately 10° from the position illustrated in FIG. 1, then a control deviation does not produce any change in a spacing at the nozzle 2 and thus does not evoke a pressure change. In other words, the P-range is infinitely large. In intermediate positions, the point of the baffle ring 1 lying in opposition to the nozzle 2 receives displacement components from the control bellows 4 providing the control variable X and guide variable W and corresponding, compensating displacement components from the return bellows 5a, 5b carrying out the R+ and R− controller functions, thereby achieving a desired controller action.

FIG. 2a provides a cross sectional view taken along the axis I—I of the controller arrangement of FIG. 1. According to this Figure, a pin 10a, located on a central section of the bellows pair 4 at a point of intersection of the longitudinal axis of the central section 4c and the effective line or axis I—I and connected to the ball bearing 7. Bellows heads 23 are supported on their outsides by the holder 17 and are fixed with regard to the height thereof by suitable fasteners such as, for example, screws 24 or the like. The bellows pair 5 includes a central section 5c which is oriented in such fashion that a longitudinal axis of the central section 5c extends along the axis or effective line I—I. The central section 5c is attached by a screw 16 to an interiorly positioned U-shaped spring brake 8b. A supporting member 15 is arranged at an upper bracket 8a of the leaf spring 8. A pin 10b is mounted to the supporting member 15, with the pin 10b passing or extending through the ball bearing 6. In this connection, the ball bearing 6 lies without clearance or play in a bore 14 located in a zone of a circumference of the baffle ring 1.

As shown in FIG. 2b, the leaf spring 8 includes two U-shaped brackets 8a, 8b which are joined together and includes two bores 15a, 16a. The supporting member 15 for the transmission pin 10b is held through the bore 15a and the interiorly positioned bracket 8b is connected, through the bore 16a, to the central section 5c of the bellows pair 5 by means of a fastener such as a screw 16. A gap S is formed between lower edges of the leaf spring 8 and a bottom of the holder 17, with the gap S being formed so that the leaf spring 8 may move freely without contacting the bottom.

If the bellows 4a is exposed to a pressure, the thus caused movement of the bellows pair 4 is transmitted through the pin 10a and ball bearing 7 to the baffle ring 1 so that the baffle ring 1 moves toward the left along the axis I—I. This parallel displacement of the baffle ring 1 along the axis I—I results in the upper bracket 8a of the leaf spring 8 being spread outwardly with respect to the bracket 8b. This occurs because a movement of the baffle ring 1 is directly transmitted through the ball bearing 6, seated without clearance in the bore 14, and the transmission pin 10b to the leaf spring 8. Due to a spreading of the leaf spring 8, no transmission of movement takes place to the bellows pair 5.

In contradistinction to the above movement, if, for example, the bellows 5b of the bellows pair 5 is exposed to pressure, then the transmission of movement of the bellows pair 5 to the baffle ring 1, caused by such pressure action, takes place in such a manner that the baffle ring 1 turns about the point of application, that is, the pin 10a of the baffle pair 4 and thereby there is likewise no transmission of movement to the bellows pair 4. Thus, the movements of the bellows pair 4, 5 are decoupled. A superposition of the two movement directions of the respective bellows 4, 5 effects a desired shift of the baffle ring 1 with respect to the nozzle 2.

Advantageously, the pins 10a and 10b are guided in the ball bearings 7, 6 so that no friction losses occur. A deformation of the baffle ring 1 is excluded since the baffle ring 1, in case of excessive pressure actions, may escape the thus evoked movements either by a rotation about the pin 10a or by a parallel displacement along the axis I—I by a spreading of the leaf spring 8.

In the arrangement of FIG. 3, the task of the present invention is accomplished by transmitting the motions of a control element 26 through a spring section 19 and a lever arm 7, on which a transmission pin is mounted, to the baffle ring 1. The control element 26 includes a bellows and a spiral or coil spring 20. For this purpose, a lever arm 18 is attached by means of a fastener, such as, for example, a screw 25, to a spring section 19b which counteracts pressure exerted on the bellows 26a. In the arrangement of FIG. 3, one bellows is replaced by the spiral coaxial spring 20 which is seated on a spring plate 21 and is pretensionable by an adjusting device such as, for example, an adjustment screw 22. By means of the spiral coaxial or coil spring 20, a spring pressure is produced which is to be compared with pressure ambient in the bellows 26a. As can readily be appreciated, the use of a spiral coaxial spring is, of course, not limited to the arrangement illustrated in FIG. 3.

It is also possible in accordance with the present invention, to arrange the bellows pair 5 outside of a plane located beneath a circumference of the baffle ring 1 in such a manner that its movements are transmitted in a tangential direction to the baffle ring 1. The transmission of the movements may be accomplished with the aid of suitable conventional transmission elements.

Figure 4B:
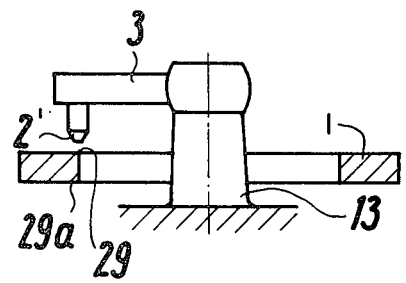
FIG. 4b is a partial cross sectional side view of a nozzle baffle tap or pick-up wherein control is performed by way of cooperation of the nozzle with an inner top edge of a baffle ring.
Figure 4C:
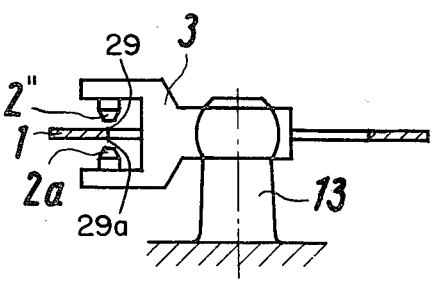
FIG. 4c is a partial cross sectional side view of a nozzle baffle tap with a jet-receiving nozzle.

FIGS. 4a–4c provide three types of nozzle baffle ring taps or pick-ups which may be employed when arranging the bellows 4, 5 or 26a in a plane beneath the baffle ring 1. More particularly, FIG. 4a provides a nozzle baffle ring tap or pick-up construction which may be used if the bellows are disposed within a circumference of the baffle ring 1 in a plane therebelow in a compact arrangement. As shown in FIG. 4a, the nozzle 2 is mounted to the nozzle pivot or swivel arm 3, seated on the nozzle stem 13, so that the nozzle 2 points in a radial direction toward an inner circumference of the baffle ring 1. The nozzle 2 has a discharge orifice which is of a smaller diameter than a height of an inner edge 1' of the baffle ring. Because the nozzle stem 13 is disposed within the contour of the baffle ring 1, advantageously, the nozzle stem 13 may have a relatively low or short structural height. This allows a controller construction having a low overall height. However, it may occur that the baffle ring 1 knocks against the nozzle 2 thereby resulting in damages to the discharge orifice.

FIG. 4B shows an arrangement which avoids a possible damaging to the discharge orifice of the nozzle, by providing a nozzle baffle ring top or pick-up wherein an operation of the control unit is effected through an edge regulation in such a manner that a nozzle 2' is provided with a discharge orifice facing toward the baffle ring 1 and a shift of the baffle ring 1 may vary the pressure of the nozzle 2'.

FIG. 4c provides yet another possibility which provides for edge regulation. More particularly, as shown in FIG. 4c, the nozzle swivel or pivot arm 3 is fashioned so as to be bifurcated and is provided with two nozzles 2", 2a. Each of the nozzles 2", 2a are provided with discharge orifices which are disposed in opposition to each other. The nozzle 2" may serve as a jet nozzle and the nozzle 2a may serve as a receiving nozzle. The inner edge of the flat constructed baffle ring 1 lies in a connecting axis of the nozzles and is displaced with resped to this axis after a pressure has been applied to the bellows (not shown). A construction such as illustrated in FIG. 4c is very sensitive and is significantly useful in controlling small pressures.

Figure 4D:
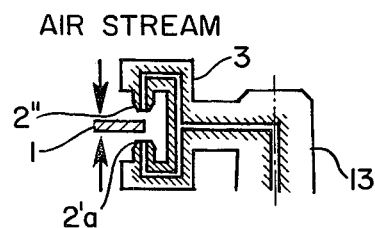
FIG. 4d is a schematic cross sectional view of a nozzle baffle tap or pick-up with a dual nozzle.

As shown in FIG. 4d, it is also possible in accordance with the present invention to provide an arrangement wherein the nozzle swivel arm 3 carries two nozzles 2" and 2'a which are constructed as jet nozzles. In the arrangement of FIG. 4d, by shifting the baffle ring 1 between the two nozzles 2", 2'a, pressure differences between the nozzles 2" and 2'a may be varied and utilized for control purposes. An advantage of this construction is that the baffle ring 1 is not unilaterally exposed to pressure. Thus a vertical position of the baffle ring 1 remains the same thereby providing a particularly shock proof solution for double edge regulation by a nozzle baffle plate control.

While I have shown and described several embodiments in accordance with the present invention, it is understood that the same is not limited thereto but is susceptible to numerous changes and modifications as known to one having ordinary skill in the art and I, therefore, do not wish to be limited to the details shown and described herein, but intend to cover all such modifications as are encompassed by the scope of the appended claims.

I claim:

1. A controller arrangement with an adjustable proportionality range, the controller arrangement comprises at least first and second measuring units adapted to be acted upon by a pressure, a ring means adapted to be positioned in response to a pressure differential in the measuring units, and a pivotable nozzle means cooperable with the ring means,
the measuring units are coupled at the ring means in a diametrically opposite manner and the axis of effectiveness of one measuring unit extends radially and the axis of effectiveness of the other measuring unit extends in a direction which is one of tangentially and in parallel to the tangential direction but not through the axis of the ring means.

2. The controller arrangement according to claim 1, wherein the first measuring unit includes a pair of bellows, and the axis of effectiveness of the first and second measuring units are perpendicular to each other.

3. The controller arrangement according to claim 2, wherein the second measuring unit includes a bellows and a coaxially disposed coil spring.

4. The controller arrangement according to claim 1, wherein both the first and second measuring units include a pair of bellows, and the axis of effectiveness of the first and second measuring units are perpendicular to each other.

5. The controller arrangement according to one of claims 1, 2, 3, or 4, wherein the connecting means connect the respective measuring units to the ring means at diametrically opposed connecting points, and the axes of effectiveness of the measuring units intersect in one of the connecting points.

6. The controller arrangement according to claim 5, wherein the connecting means include ball bearing means arranged in a circumferential zone of the ring means, and means are provided in the circumferential zone of the ring means for accommodating the ball bearing means.

7. The controller arrangement according to claim 6, wherein the accommodating means includes bores provided in the ring means, and the bores are dimensioned so as to seat the ball bearing means therein without clearance.

8. The controller arrangement according to claim 6, wherein the measuring unit having a radially extending axis of effectiveness has an axis of rotation about the connecting point.

9. The controller arrangement according to claim 4, that measuring units are disposed in a plane located below the ring means such that the pair of bellows of one of the measuring units are arranged within circumferential confines of the ring means and one of the bellows of the pair of bellows of the second measuring unit is arranged within the circumferential confines of the ring means, while the other bellows of the pair of bellows of the second measuring unit lies outside of the circumferential confines of the ring means.

10. The controller arrangement according to claim 9, wherein the measuring unit arranged within the circumferential confines of the ring means is the second measuring unit.

11. The controller arrangement according to claim 10, wherein the pair of bellows of the first measuring unit includes a central section, the connecting means includes ball bearing means arranged in a circumferential zone of the ring means, a transmission pin means is inserted in the central section, and the transmission pin means is connected to the ring means through the ball bearing means.

12. The controller arrangement according to claim 11, wherein a further transmission pin means is operatively connected to the pair of bellows of the second measuring unit, and a spring support means is provided for supporting the further transmission pin means at the second measuring unit.

13. The controller arrangement according to claim 12, wherein the spring support means includes a leaf spring having two nestled U-shaped spring brackets with ends of the spring brackets joined together, the outer spring bracket forms a holder for the further transmission pin means, and means are provided for attaching the inner spring bracket to a central section of the pair of bellows of the second measuring unit.

14. The controller arrangement according to claim 4, wherein at least one of the pairs of bellows are arranged in a plane beneath the ring means outside of a circumference of the ring means, and means are provided for transmitting motion of the pair of bellows to the ring means when the bellows are exposed to a pressure.

15. The controller arrangement according to one of claims 1, 2, 3, 4, 9, 11, 12, 13, or 14, wherein the nozzle means includes a nozzle stem, and a nozzle pivot arm disposed on the nozzle stem, and a nozzle portion provided on the nozzle pivot arm, and the nozzle portion is provided with a discharge orifice which points in a radial direction toward an inner circumference of the ring means.

16. The controller arrangement according to claim 15, wherein the discharge orifice has a diameter which is less than a height of an inner edge of the ring means.

17. The controller arrangement according to claim 15, wherein the nozzle pivot arm extends in a plane above the ring means, and the nozzle portion is arranged on an underside of the nozzle pivot arm at a position vertically spaced from an inner edge of the ring means with the discharge opening pointing toward an upper inner edge of the ring means.

18. The controller arrangement according to one of claims 1, 2, 3, 4, 9, 11, 12, 13, or 14, wherein the ring means is a flat baffle ring member, the nozzle means includes a bifurcated nozzle pivot arm, and a nozzle portion provided on the pivot arm, the nozzle portion includes a jet nozzle and a receiving nozzle, and the nozzle portion is arranged such that the jet nozzle is disposed above a top inner edge of the baffle ring member and the receiving nozzle is disposed below a bottom inner edge of the baffle ring member whereby an air stream may flow in a vertical direction from the jet nozzle to the receiving nozzle.

19. The controller arrangement according to one of claims 1, 2, 3, 4, 9, 11, 12, 13, or 14, wherein the ring means is a flat baffle ring, the nozzle means includes a bifurcated nozzle pivot arm and a nozzle portion provided on the pivot arm, and the nozzle portion includes two jet nozzles, wherein the nozzle portion is arranged such that one of the jet nozzles is disposed above a top inner edge of the baffle ring, and the other jet nozzle is disposed below a bottom inner edge of the baffle ring.

20. The controller arrangement according to claim 19, wherein a nozzle pivot arm is held on a nozzle stem and means are provided for threadably connecting the nozzle stem to the nozzle pivot arm.

21. The controller arrangement according to one of claims 1, 2, 3, or 4, the connecting means include ball bearing means arranged in a circumferential zone of the ring means, and means are provided in the circumferential zone of the ring means for accommodating the ball bearing means.

22. The controller arrangement according to claim 21, wherein the accommodating means includes bores provided in the ring means, and the bores are dimensioned so as to seat the ball bearing means therein without clearance.

23. The controller arrangement according to one of claims 1, 2, or 3, wherein the measuring units are disposed in a plane located below the ring means, one of the measuring units is located within a circumferential confine of the ring means, and at least a portion of the other measuring unit lies outside of the circumferential confines of the ring means.

24. The controller arrangement according to claim 23, wherein the measuring unit arranged within the circumferential confines of the ring means is the second measuring unit.

25. The controller arrangement according to claim 3, further including means for counteracting pressure on the bellows of the second measuring unit.

26. The controller arrangement according to claim 25, wherein the means for counteracting the pressure is attached to the spring section with a fastener.

27. The controller arrangement according to claim 3, further including adjusting means for pretensioning the coil spring of the second measuring unit.

28. A controller according to claim 27, wherein the line of effectiveness of the second measuring unit means extends in a direction not through the axis of the ring means.

* * * * *